United States Patent
Lu et al.

(10) Patent No.: US 11,013,060 B2
(45) Date of Patent: *May 18, 2021

(54) SELECTIVE MULTIPLE-MEDIA ACCESS CONTROL

(71) Applicant: TEXAS INSTRUMENTS INCORPORATED, Dallas, TX (US)

(72) Inventors: Xiaolin Lu, Plano, TX (US); Robert Liang, Frisco, TX (US); Mehul Soman, Sunnyvale, CA (US); Kumaran Vijayasankar, Allen, TX (US); Ramanuja Vedantham, Allen, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/159,265

(22) Filed: Oct. 12, 2018

(65) Prior Publication Data

US 2019/0052716 A1 Feb. 14, 2019

Related U.S. Application Data

(63) Continuation of application No. 14/516,168, filed on Oct. 16, 2014, now Pat. No. 10,104,192.

(60) Provisional application No. 61/891,755, filed on Oct. 16, 2013.

(51) Int. Cl.
*H04L 29/08* (2006.01)
*H04W 80/02* (2009.01)

(52) U.S. Cl.
CPC .................................. *H04W 80/02* (2013.01)

(58) Field of Classification Search
CPC ...................................................... H04L 67/28
See application file for complete search history.

(56) References Cited

U.S. PATENT DOCUMENTS

| 9,152,706 B1 | 10/2015 | Claudatos et al. | |
| 2007/0133586 A1* | 6/2007 | Ojard | H04L 1/0072 370/421 |
| 2008/0162135 A1* | 7/2008 | Claudatos | H04L 63/00 704/243 |
| 2013/0272292 A1* | 10/2013 | Hunter | H04L 45/74 370/338 |

* cited by examiner

*Primary Examiner* — Adnan M Mirza
(74) *Attorney, Agent, or Firm* — Brian D. Graham; Charles A. Brill; Frank D. Cimino (57) ABSTRACT

Disclosed embodiments include a network device having a split network stack that includes a physical (PHY) layer associated with first and second media access control (MAC) protocol sublayers, a processing device, and memory storing instructions that, when executed by the processing device, cause the processing device to select a route through the split network stack that includes one of the first and second MAC protocol sublayers but not the other one of the first and second MAC protocol sublayers.

19 Claims, 7 Drawing Sheets

| LENGTH OCTETS | BITS 7 | 6 | 5 | 4 | 3 | 2 | 1 | 0 |
|---|---|---|---|---|---|---|---|---|
| 1 | MESSAGE TYPE <u>610</u> ||||||||
| 1 | RESERVED <u>622</u> ||| INTERFACE IDENTIFIER <u>624</u> |||||
| 2 | SEQ NO <u>626</u> ||||||||
| VARIABLE | MESSAGE PAYLOAD LENGTH <u>630</u> ||||||||
| | MESSAGE PAYLOAD <u>640</u> ||||||||
| 2 | MESSAGE HEADER CRC <u>650</u> ||||||||
| 2 | MESSAGE PAYLOAD CRC <u>660</u> ||||||||

SELECTIVE MULTIPLE-MEDIA ACCESS CONTROL

CROSS-REFERENCE TO RELATED APPLICATION(S)

This application is a continuation of U.S. patent application Ser. No. 14/516,168 filed on Oct. 16, 2014 (now U.S. Pat. No. 10,104,192), which claims priority to U.S. Provisional Application No. 61/891,755 entitled "DUAL MAC" filed Oct. 16, 2013 in the United States Patent and Trademark Office, wherein the applications listed above are hereby fully incorporated by reference herein for all purposes.

BACKGROUND

Utilities are increasingly using networked meters to reduce meter-reading costs and to monitor user consumption in real-time. Networking applications such as power line communications (PLC) typically use the TCP/IP (transmission control protocol/internet protocol) stack architecture. The conventional MAC (medium access control) layer is part of a network protocol layer that controls the access to a communications channel. In conventional network architectures, each protocol stack is associated with a single network. The conventional MAC layer is normally assigned a unique address to identify itself in various communications within the network. The conventional MAC layer includes a protocol stack that can communicate with resources within the network using the assigned address. However, such conventional network protocols are not well suited for communications over different networks using different protocols.

SUMMARY

The problems noted above can be addressed in a communication system and method operable to receive, for example, payload data of first and second media access control (MAC) frames. A MAC-level protocol is identified in response to the indication of the selected network for each of the first and second MAC frames. The payload data of the first and second MAC frames is transmitted and/or received across respective networks transmitted using, for example, power line communications signals over a common communications medium. The common communications medium is operable for carrying signals of a plurality of networks.

This Summary is submitted with the understanding that it is not be used to interpret or limit the scope or meaning of the claims. Further, the Summary is not intended to identify key features or essential features of the claimed subject matter, nor is it intended to be used as an aid in determining the scope of the claimed subject matter.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be example of that embodiment, and not intended to intimate that the scope of the disclosure, including the claims, is limited to that embodiment.

Certain terms are used throughout the following description—and claims—to refer to particular system components. As one skilled in the art will appreciate, various names may be used to refer to a component or system. Accordingly, distinctions are not necessarily made herein between components that differ in name but not function. Further, a system can be a sub-system of yet another system. In the following discussion and in the claims, the terms "including" and "comprising" are used in an open-ended fashion, and accordingly are to be interpreted to mean "including, but not limited to . . . ." Also, the terms "coupled to" or "couples with" (and the like) are intended to describe either an indirect or direct electrical connection. Thus, if a first device couples to a second device, that connection can be made through a direct electrical connection, or through an indirect electrical connection via other devices and connections. The term "portion" can mean an entire portion or a portion that is less than the entire portion.

Figure 1:
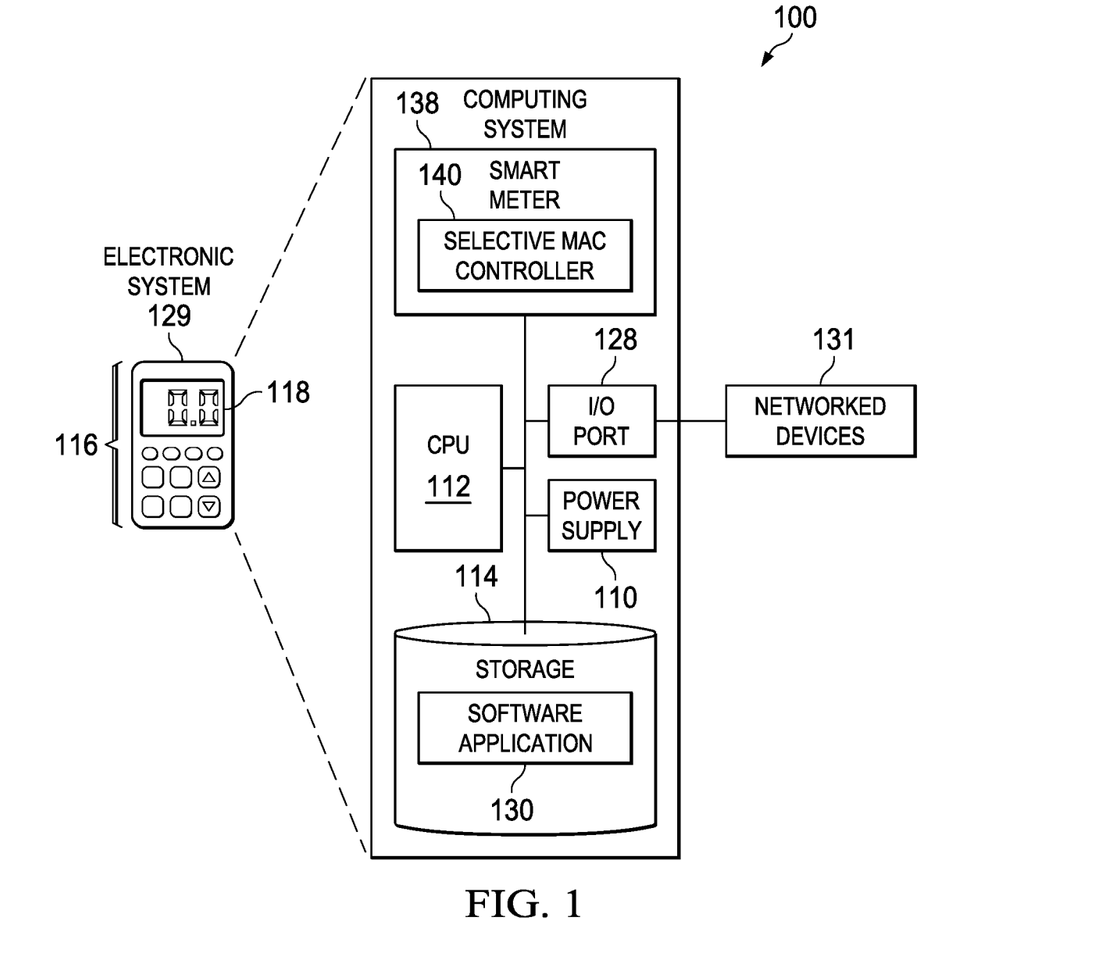
FIG. 1 shows an illustrative electronic device in accordance with example embodiments of the disclosure.

FIG. 1 shows an illustrative computing device 100 in accordance with preferred embodiments of the disclosure. For example, the computing device 100 is, or is incorporated into, an electronic system 129, such as a computer, electronics control "box" or display, communications equipment (including transmitters), or any other type of electronic system arranged to generate radio-frequency signals.

In some embodiments, the computing device 100 comprises a megacell or a system-on-chip (SoC) which includes control logic such as a CPU 112 (Central Processing Unit), a storage 114 (e.g., random access memory (RAM)) and a power supply 110. The CPU 112 can be, for example, a CISC-type (Complex Instruction Set Computer) CPU, RISC-type CPU (Reduced Instruction Set Computer), MCU-type (Microcontroller Unit), or a digital signal processor (DSP). The storage 114 (which can be memory such as on-processor cache, off-processor cache, RAM, flash memory, data registers, flip-flops, disk storage, and the like) stores one or more software applications 130 (e.g., embedded applications) that, when executed by the CPU 112, perform any suitable function associated with the computing device 100.

The CPU 112 comprises memory and logic that store information frequently accessed (e.g., written to and/or read from) from the storage 114. The computing device 100 is often controlled by a user using a UI (user interface) 116, which provides output to and receives input from the user during the execution the software application 130. The output is provided using the display 118, indicator lights, a speaker, vibrations, and the like. The input is received using audio and/or video inputs (using, for example, voice or image recognition), and electrical and/or mechanical devices such as keypads, switches, proximity detectors, gyros, accelerometers, and the like. The CPU 112 is coupled to I/O (Input-Output) port 128, which provides an interface that is configured to receive input from (and/or provide output to) networked devices 131. The networked devices 131 can include any device (including key fobs or base-station control modules that are electronically paired with the computing device 100) capable of point-to-point and/or networked communications with the computing device 100. The computing device 100 is optionally coupled to peripherals and/or computing devices, including tangible, non-transitory media (such as flash memory) and/or cabled or wireless media. These and other input and output devices are selectively coupled to the computing device 100 by external devices using wireless or cabled connections. The storage 114 is accessible, for example, by the networked devices 131.

The CPU 112 is coupled to I/O (Input-Output) port 128, which provides an interface that is configured to receive input from (and/or provide output to) peripherals and/or computing devices 131, including tangible (e.g., "non-transitory") media (such as flash memory) and/or cabled or wireless media (such as a Joint Test Action Group (JTAG) interface). These and other input and output devices are selectively coupled to the computing device 100 by external devices using wireless or cabled connections. The CPU 112, storage 114, and power supply 110 can be coupled to an external power supply (not shown) or coupled to a local power source (such as a battery, solar cell, alternator, inductive field, fuel cell, capacitor, and the like).

The disclosed selective multiple-media access control techniques include, for example, an architecture where a physical layer (for controlling communication across a communications medium) is shared between multiple networks via one or more portions of a (e.g., horizontally) split MAC protocol stack associated with the physical layer. The illustrated embodiments include architectures that demonstrate operation over two networks as an example and the disclosed techniques can be extended to select amongst two, three, four, or more networks by selecting a portion of a split MAC protocol stack associated with one of the various networks.

The computing system 100 includes a smart meter 138 that is arranged to receive and transmit packet-based communications based on the OSI (open-systems interconnection) model (e.g., layered protocol stack). The smart meter 138 is arranged to provide power line communications (PLC) using a selective MAC (media access control) controller 140 for performing MAC-level protocols and for selecting a physical layer over which the packet-based communications are to be sent and received.

Conventional devices such as switches, routers and gateways are arranged to share protocol layers for different networks. Such devices are capable of evaluating the source of the packet (from information received from the interface through which the packet is received) and retransmitting (e.g. forwarding) the received packet using a selected output interface that is selected as being appropriate on the basis of a forwarding strategy that is associated with the packet. However, the conventional devices (such as switches, routers and gateways) are not normally individual entities that are a part of a member network itself, but are special devices that are dedicated to serve as a bridge between different networks. Such bridge devices normally include separate network stacks for each different network interface.

Figure 2:
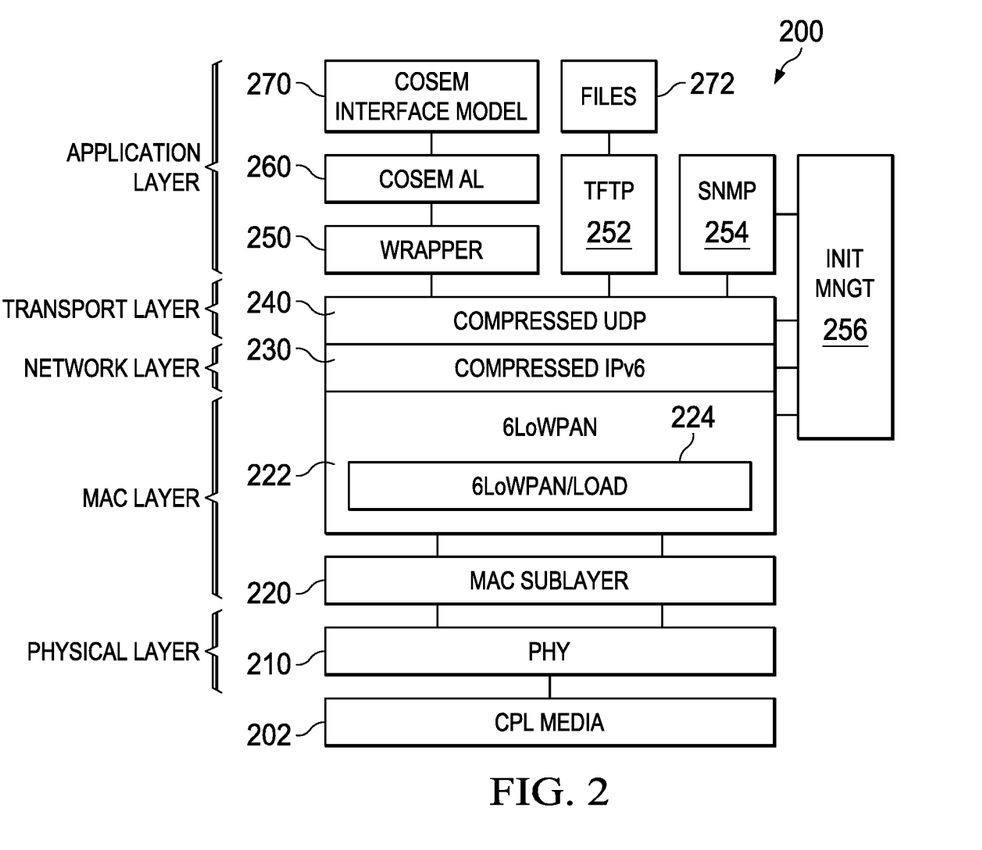
FIG. 2 is a block diagram illustrating a network architecture having selective media access control in accordance with various embodiments of the disclosure.

FIG. 2 is a block diagram illustrating a network architecture having selective media access control in accordance with various embodiments of the disclosure. Although the disclosed architecture can be applied to virtually any stack-based network, the G3-PLC protocol-based PLC network is used herein for purposes of illustration. Generally described, the G3-PLC standard is directed towards power line communications.

The network stack 200 is a network stack organized in accordance with a G3-PLC protocol stack. The network stack 200 is illustrated as having five layers: the physical layer, the MAC layer, the network layer, the transport layer, and the application layer. The physical layer includes physical layer (PHY) 210 that is coupled to a communication medium via coupler (CPL) 202. The MAC (media access control) layer includes the MAC sublayer 220, the 6LoW-PAN (IPv6 over low power wireless personal area networks) adaptation sublayer 222, and the 6LoWPAN/LOAD (IPv6 ad hoc on-demand distance vector routing) adaptation sublayer 224. The network layer includes the compressed IPv6 (Internet protocol version six) layer 230. The transport layer includes the UDP (user datagram protocol) layer 240. The application layer includes the wrapper 250, the COSEM (companion specification for energy metering) application layer 260, the COSEM interface model 270, the TFTP (trivial file transfer protocol) 252, the SNMP (simple network time protocol) 254, and files 272. The initialization manager (INIT MNGT) 256 is operable for initializing the logical states of the various layers and sublayers.

The MAC sublayer 220 is normally responsible for granting channel access and for filtering frames using network addresses. In an example G3-PLC network, each node joins to a personal area network (PAN) identified by an associated PAN identifier (PAN ID). The MAC sublayer 220 receives packet frames from the PAN and filters the frames in accordance with the PAN ID and the MAC sublayer 220 address and directs the filtered frames to one of the MAC sublayers 222 and 224 (e.g., as described below with reference to 6LoWPAN and 6LoWPAN/LOAD MAC sublayers 424 and 428 of FIG. 4). The MAC sublayer 220 transmits the filtered frames to higher levels of the stack that contains the MAC sublayer 220, so that the higher layers (such as the network layer, transport layer, and application layer) of the appropriate stack receive and process the filtered packet frames associated with a PAN network as identified by a PAN ID.

Figure 3:
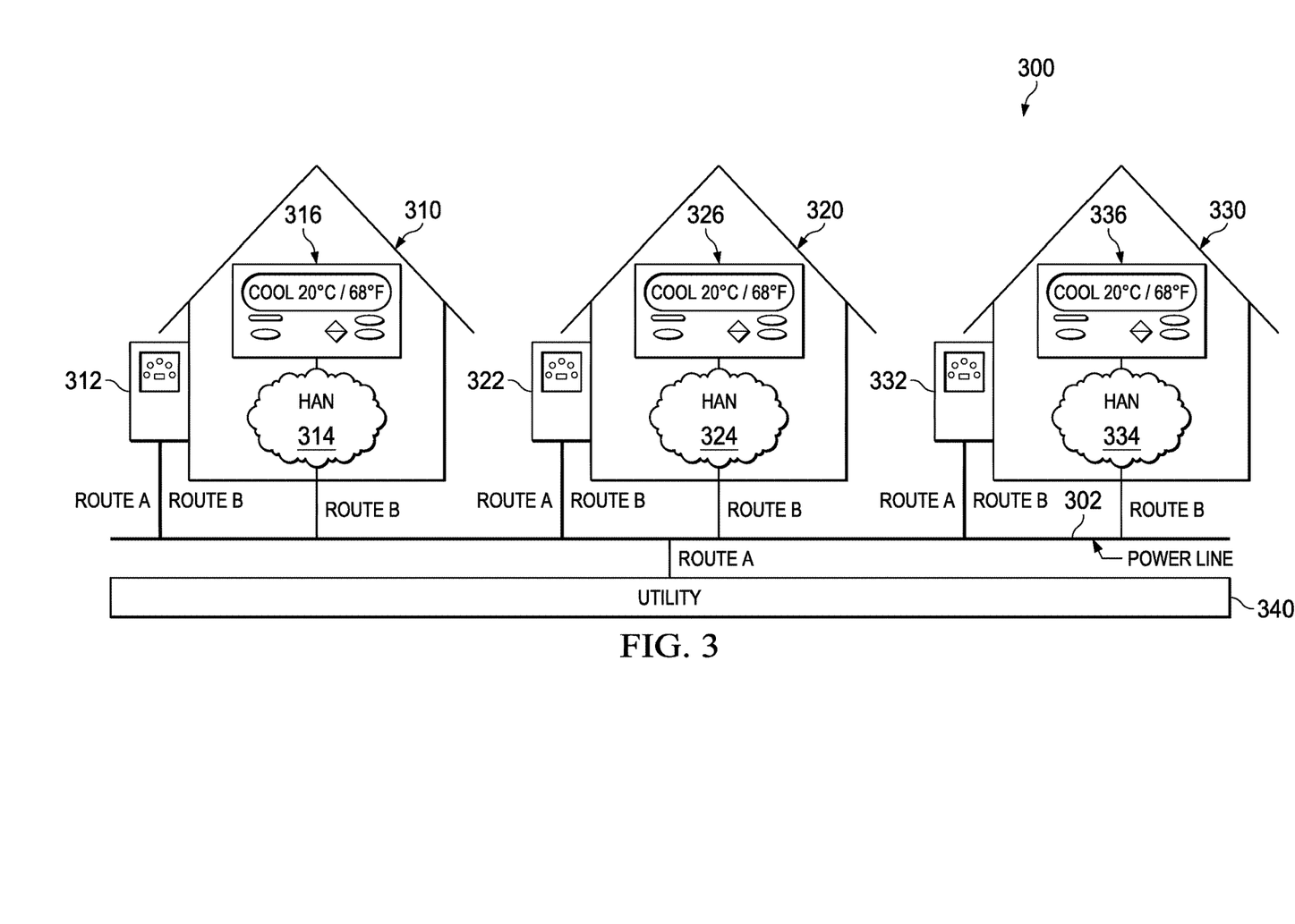
FIG. 3 is a block diagram illustrating nodes of a network having selective media access control in accordance with various embodiments of the disclosure.

FIG. 3 is a block diagram illustrating nodes of a network having selective media access control in accordance with various embodiments of the disclosure. The neighborhood 300 includes houses 310, 320, and 330. For purposes of illustration, three houses are shown: the neighborhood 300 optionally includes more or less houses. The neighborhood 300 includes a portion (including the entire portion) of a neighborhood of houses served by a utility 340 (e.g., power, gas, and water utilities, as well as any utility providing metered access to a supplied commodity).

The house 310 includes a selective media access control smart meter 312, a personal area network (such as a home area network 314), and a home energy management system (HEMS) controller 316. The HEMS controller 316 is arranged for communicating with the a selective media access control smart meter 312 using protocol route B via HAN 314 and power line 302 Route B is discussed below, for example, with respect to FIG. 4 below. The HAN 314 is a network such as a home network that is operable for controlling home appliances using power line communications. The selective media access control smart meter 312 is operable for communicating with utility 340 using protocol route A (e.g., which is suitable for longer-travelled and faster-data-rate communications than route B) across power line 302. Route A is discussed below, for example, with respect to FIG. 4.

The house 320 includes a selective media access control smart meter 322, a personal area network (such as a HAN 324), and a HEMS controller 326. The HEMS controller 326 is arranged for communicating with the a selective media access control smart meter 322 using protocol route B via HAN 324 and power line 302. The HAN 324 is a network such as a home network that is operable for controlling and monitoring home appliances using power line communications. The selective media access control smart meter 322 is operable for communicating with utility 340 using protocol route A across power line 302.

The house 330 includes a selective media access control smart meter 332, a personal area network (such as a HAN 334), and a HEMS controller 336. The HEMS controller 336 is arranged for communicating with the a selective media access control smart meter 332 using protocol route B via HAN 334 and power line 302. The HAN 334 is a network such as a home network that is operable for controlling home appliances using power line communications. The selective media access control smart meter 332 is operable for communicating with utility 340 using protocol route A across power line 302.

In an example scenario, the smart meter 312 of the house 310 serves as both as a node of a "route A" network (e.g., for communicating with utility 340 processors) and as a node of HAN 314 (e.g., for controlling and monitoring home appliances). In such a situation the smart meter 312 is both part of the utility network 302 and also the personal area network 314. When the same node (such as smart meter 312) attempts to access the two different networks (such as utility network 302 and PAN 314), two G3-PLC protocol stacks are used, with each stack being associated a separate network. In the example scenario, the smart meter 312 is a network entity of both the utility network 302 and the HAN 314.

Figure 4:
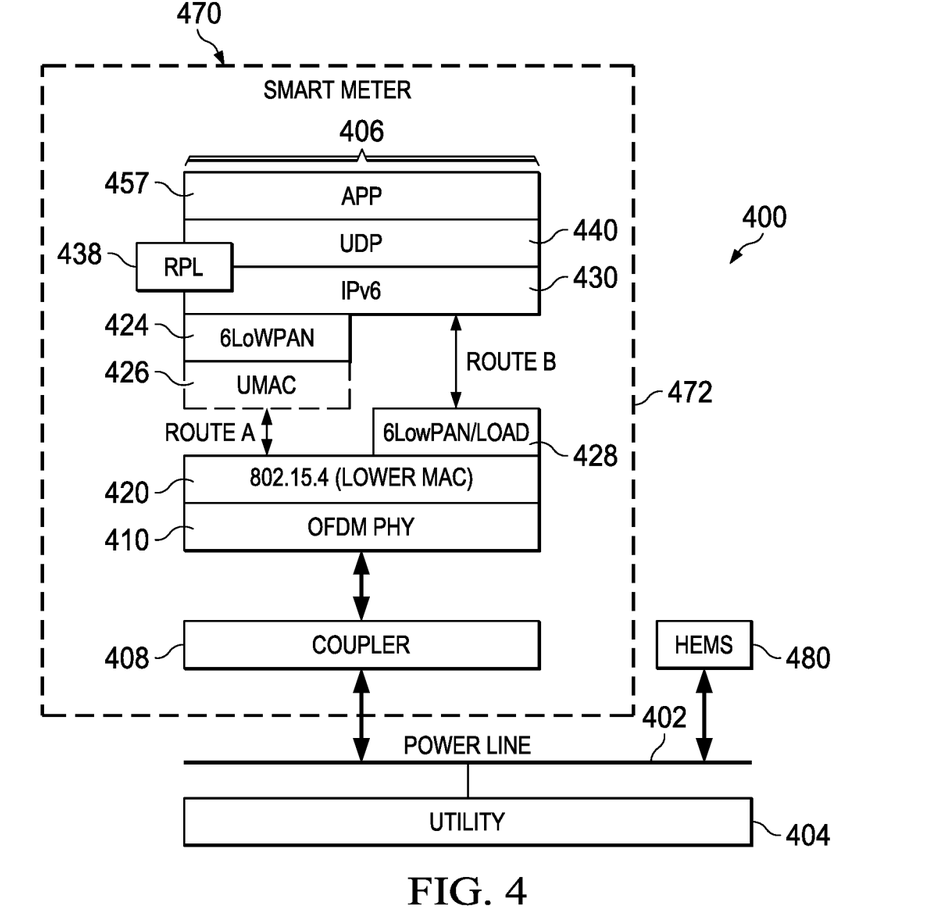
FIG. 4 is a block diagram illustrating a split network stack having selective media access control in accordance with various embodiments of the disclosure.

FIG. 4 is a block diagram illustrating a split network stack having selective media access control in accordance with various embodiments of the disclosure. The home-energy management network 400 includes a smart meter 470 and a HEMS 480. The smart meter 470 includes a split network stack 406 is that arranged for performing power line communications using differing MAC-level protocols for communications across power line 402. For example, the split network stack 406 is operable for communicating with the utility 404 (via Route A) and for communicating with HEMS 480 (via Route B). Accordingly, route A and route B are different paths through the MAC layer by using the same (or different) MAC-level protocols that operate over two different networks. The two different networks communicate over a common power line 402. In such cases, a node belonging to one network will typically filter out the frames received from another network via the common power line 402.

The split network stack 406 is a network stack having a split-MAC layer protocol stack architecture. The split network stack 406 includes MAC layer that is split (e.g., vertically and horizontally) at different points for performing and controlling communication over two networks (e.g., across the same physical medium) via Route A and Route B. A first portion (e.g., 6LoWPAN/LOAD 428) of the split MAC layer is associated with lower layers of the split networks stack 406. A second portion (e.g., 6LoWPAN 424 and UMAC 426) of the split MAC layer is associated with higher layers of the split network stack 406.

The split network stack 406 includes coupler 408, orthogonal frequency-division multiplexing physical layer (OFDM PHY) 410, IEEE standard 802.15.4 (lower MAC) layer 420, 6LoWPAN LOAD (IPv6 ad hoc on-demand distance vector routing) sublayer 428, UMAC (universal-hashing message authentication code) layer 426, 6LoWPAN sublayer 424, compressed IPv6 (Internet protocol version 6) layer 430, RPL (routing protocol for low-power and lossy networks) layer 438, compressed UDP (user datagram protocol) 440, and application layer (APP) 457.

The split MAC layers (424, 426, 428) of the split network stack 406 are operable for storing and accessing the PAN ID of the associated PAN network and the MAC address associated with each communication received from or transmitted to each PAN. The lower MAC layer 420 of the split network stack 406 is operable for selecting a PAN for transmitting the packets received from higher layers. The PAN (e.g., together with the associated route A or route B) is selected in accordance with the MAC address and PAN ID associated with the PAN packets to-be transmitted. The packets to-be transmitted are transmitted over the power line 402, which is shared by different PANS (including the selected PANS).

Upon receiving a packet transmitted across the power line 402, the split MAC layer of the split network stack 406 is arranged for identifying the network (e.g., in accordance with the PAN ID and MAC address associated with the received packed) of the and routing the (e.g., payload of the) received packet to the appropriate higher layer.

In the illustrated architecture, the higher layers (e.g., such as layers 430 and 440) of applications respectively use G3-PLC protocols but with different routing protocols (e.g., the LOAD or RPL protocols). However, the disclosed methods are operable to handle devices that operate over different networks (which optionally operate with different network protocols) in accordance with the different network protocol layers that are above the MAC level.

Various devices (e.g., network entities) coupled to the power line 402 access the split MAC layer of split network stack 406 to share a channel-access mechanism (e.g., carrier sense multiple access with collision avoidance, or "CSMA/CA") and the PHY layer to access at least two different networks that use the power line 402 as the PHY layer. In an embodiment, the split MAC layers (424, 426, 428) of the split network stack 406 allow the protocol stack to be implemented in the same substrate (e.g., monolithic integrated circuit), which reduces system cost and/or decreases power dissipation.

Figure 5:
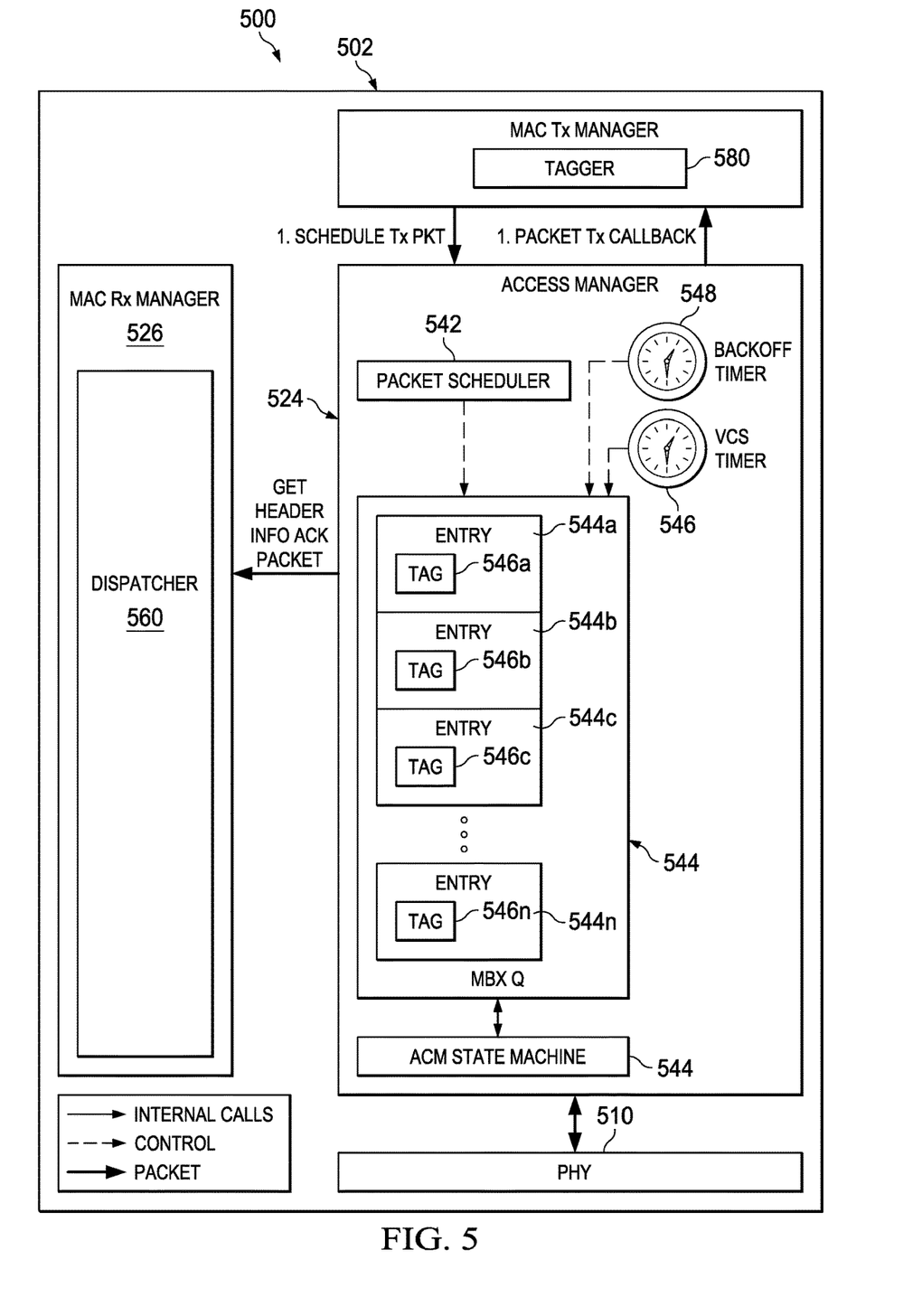
FIG. 5 is a block diagram illustrating a selective media access controller in accordance with various embodiments of the disclosure.

FIG. 5 is a block diagram illustrating a selective media access controller in accordance with various embodiments of the disclosure. The selective media access controller 500 is optionally implemented in a first substrate 502 (e.g., where the application and other higher layer functions are implemented in a second, different substrate while the MAC and PHY layer functions are implemented in the first substrate). The selective media access controller 500 is optionally arranged as discrete logic, memory, a microprocessor, and/or combinations thereof.

The selective media access controller 500 is arranged for performing the functions of encryption/decryption, segmentation/reassembly of packets, channel access (e.g., including arbitration), and address filtering. In various embodiments, a single selective media access controller 500 optionally is operable for performing the MAC and PHY layer functions of with encryption/decryption and segmentation and reassembly of packets for only one of the two networks (e.g., where each network is respectively accessed via route A or route B in FIG. 4 discussed above), and a second controller optionally is operable for performing the MAC and PHY layer functions of with encryption/decryption and segmentation and reassembly of packets for the other one of the two networks. However, the selective media access controller 500 is operable to perform (e.g., both the higher-level) functions of channel access, and address filtering for both such networks.

The selective media access controller 500 is operable for performing dual MAC functions (e.g., for controlling access to the physical layer of two networks). The dual MAC functions optionally have multiple (e.g., concurrent) active sessions with a network entity that includes the selective media access controller 500. The access manager 524 is operable for performing channel-access (e.g., CSMA/CA) functions under the control of the MAC TX (transmit) manager 528.

In response to the selective media access controller 500 receiving frames from higher layers, the access manager 524 stores the received frames (e.g., as entries 544a, 544b, 544c, through 544n) in a common queue (e.g., MBX Q 544). The packet scheduler 542 schedules the stored frames for transmission. The tagger 580 of the MAC TX manager 528 generates a network tag such as a tag identifier for each stored frame such that the access manager 524 is able to identify the source of (e.g., the application initiating) each frame stored in the common queue and/or identify a network over which the received frame is transmitted and received. A tag identifier (e.g., tags 546a, 546b, 546c, through 546n) is optionally stored in the MBX Q 544 in association with each stored frame entry (e.g., 544a) such that, for example, the tag identifier is located and retrieved in response to a query using an indication of the identifier of the associated stored frame. An indication of the tag identifier is optionally stored (e.g., in place of the tag itself) by storing each frame in a location of the queue 544 (or in a separate queue as in the queues 744 and 757 of FIG. 7, discussed below) that is associated with a particular protocol. The access manager 524 performs channel access sequentially for each of the packets in the queue and ensures that each packet is transmitted. The access manager 524 may treat with same priority or different priorities based on the tag.

In response to receiving a frame, the MAC Rx Manager 526 tags the packet (that includes the received frame) in response to the identity of the incoming network (which can be determined through network address identifiers such as the PAN ID carried by the frame). The packet can be tagged with an indication of the network such that the network can be identified by the tag itself. The network can be any network operating (at least) at a MAC level (e.g., the network optionally includes protocols at higher layers). The selective media access controller 500 then passes the frame to the corresponding higher layer stack for further processing.

After receiving a frame from the PHY layer, the MAC RX (receiver) manager 526 examines the header information of the packet (that includes the received frame) to determine the PAN ID and the "short" address (MAC address) contained within the packet. The dispatcher 560 is arranged for determining whether both the PAN ID (e.g., which identifies which PAN) and short address (e.g., which identifies a node within the identified PAN) are associated with broadcast addresses. When both the PAN ID and short address are associated with broadcast addresses, the dispatcher 560 is operable for forwarding the received frame to both the MAC higher layers (e.g., 6LoWPAN 424 and 6LoWPAN LOAD 428). When both the PAN ID and short address are not associated with broadcast addresses, the dispatcher 560 is operable for forwarding the received frame to the appropriate higher layer as identified by the PAN ID and short address (or, e.g., dropped if it does not identified as being associated with the device that includes the selective media access controller 500). For unicast addresses, the dispatcher 560 forwards the received frame to the appropriate higher layer as identified by the PAN ID and short address.

The state machine 540 is a controller operable for controlling various access manager 524 functions. For example, the controlled functions include performing CSMA/CA for access to the PHY layer, virtual carrier sensing (VCS) using VCS timer 546, and performing back-off channel access using timer 748. The state machine 540 is operable for controlling various access manager 524 functions that are accessed via either of the two protocols (e.g., conducted through Route A or Route B of split network stack 406).

Accordingly, the selective media access controller 500 is operable for performing different roles for the different networks (e.g., a first role in a first network and a second role in a second network). For example, the selective media access controller 500 using a split protocol stack can assume the role of a PAN coordinator (e.g., server) in a first network (e.g., via route B) with which the home energy management system (HEMS) device is coupled. At the same time (for example), the selective media access controller 500 is operable to respond as a controlled device (e.g., client) with respect to the utility network such that a utility can control the selective media access controller 500 in a second network (e.g., via route A) that uses the same physical medium as the first network. Accordingly, a device incorporating the selective media access controller 500 can operate in differing roles in differing networks while operating over the same split protocol stack.

Figure 6:
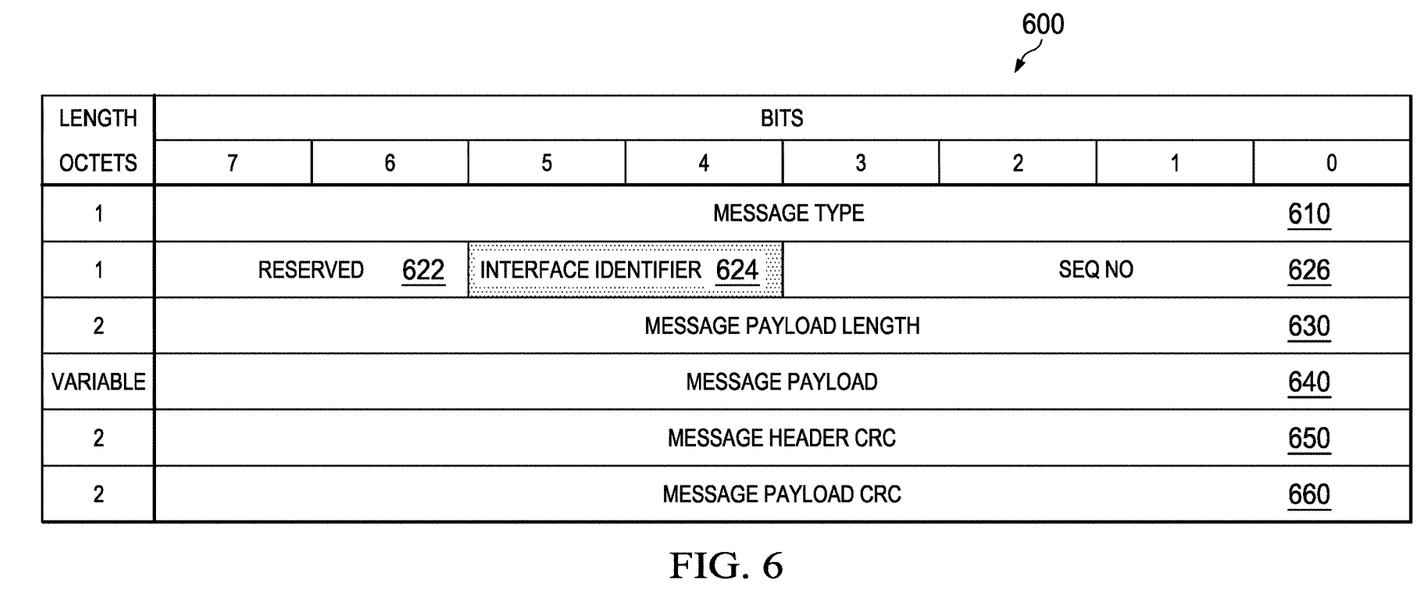
FIG. 6 is a signal diagram illustrating a frame for selective media access in accordance with various embodiments of the disclosure.

FIG. 6 is a signal diagram illustrating a frame for selective media access in accordance with various embodiments of the disclosure for signaling from/to higher layers. Frame 600 includes various fields including the message type 610, reserved 622, interface identifier 624, sequence number (SEQ NO) 626, message payload length 630, message payload 640, message header CRC (cyclical redundancy check) with 650, and message payload CRC 660 fields. The interface identifier 624 field occupies two bits (e.g., repurposed from a conventional reserved field) for identification of the source (e.g., from a particular protocol path) of a received frame 600. For example, the two-bit-long interface identifier 624 field identifies up to four sources of the frame received from a higher layer in the protocol stack. In accordance with the example of FIG. 4, an interface identifier 624 field value of 0 is used to identify a Route A network, and an interface identifier 624 few of the value of 1 is used to identify a Route B network. The bit length of the interface identifier 624 field is optionally increased for identification of more than four sources (e.g., which are accessed via higher layer protocol stacks).

Figure 7:
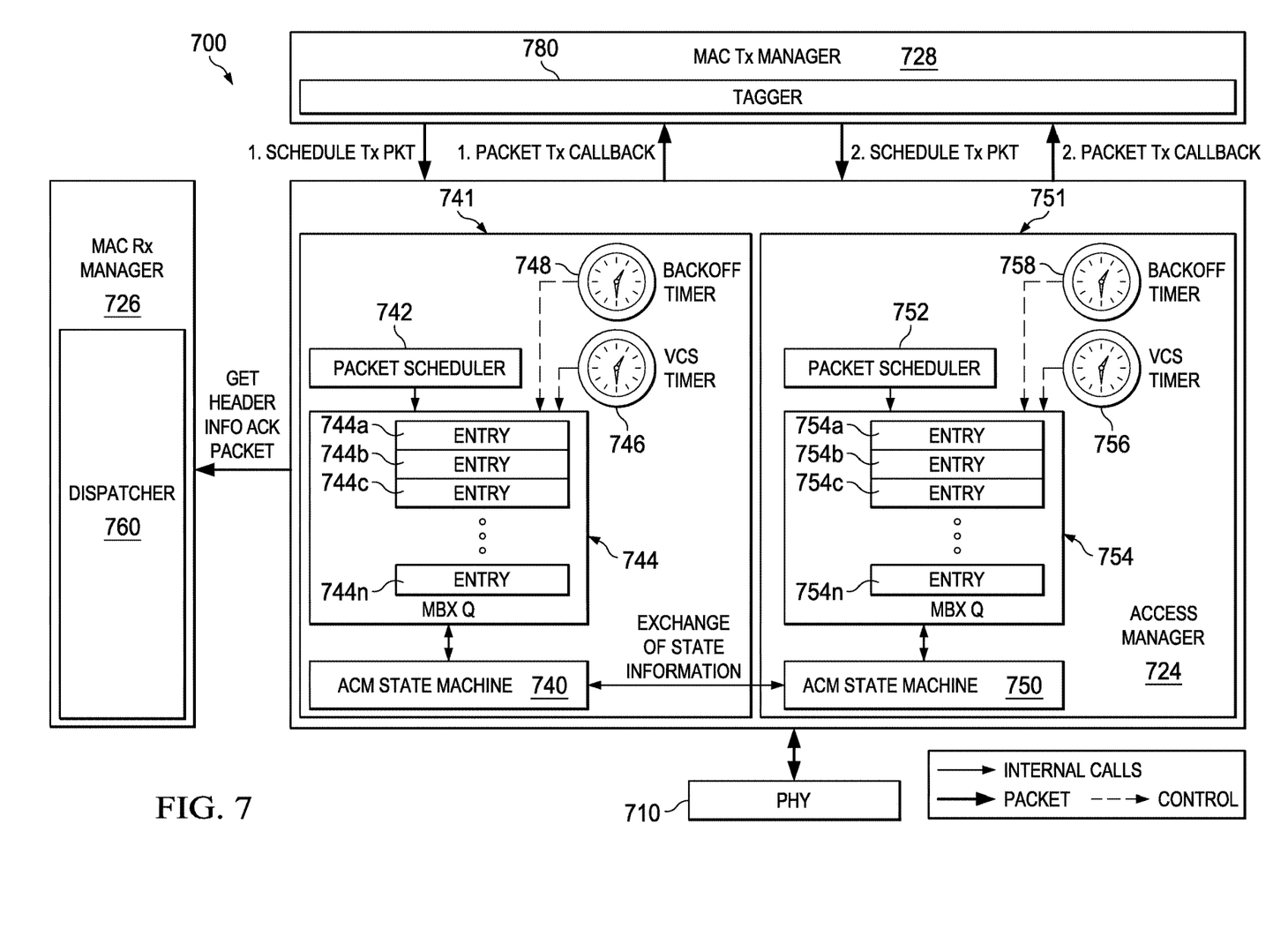
FIG. 7 is a block diagram illustrating an alternative selective media access controller in accordance with various embodiments of the disclosure.

FIG. 7 is a block diagram illustrating an alternative selective media access controller in accordance with various embodiments of the disclosure. The selective media access controller 700 is optionally implemented in a first substrate (e.g., where the application and other higher layer functions are implemented in a second, different substrate while the MAC and PHY layer functions are implemented in the first substrate). The selective media access controller 700 is optionally arranged as discrete logic, memory, a microprocessor, and/or combinations thereof.

The selective media access controller 700 is operable for performing parallel CSMA/CA functions such that two channel access mechanisms are performed simultaneously (e.g., overlapping in time) for different networks. For example, the different networks each typically have different higher protocol layers that receive calls from the selective media access controller 700. The selective media access controller 700 is operable to perform co-ordination between the two channel access methods to avoid (e.g., time-consuming) access collisions between the two transmissions associated with each channel access method.

The selective media access controller 700 is operable for performing dual MAC functions (e.g., for controlling access to the physical layer of two networks). The dual MAC functions optionally have multiple (e.g., concurrent) active sessions with a network entity that includes the selective media access controller 700. The access manager 724 is operable for performing channel-access (e.g., CSMA/CA) functions for a first network under the control of the MAC TX (transmit) manager 728.

In response to the selective media access controller 700 receiving frames from a first application, the access manager 724 stores the received frames from higher layers (e.g., as entries 744a, 744b, 744c, through 744n) in a common queue (e.g., MBX Q 744) of a channel access controller 741. The packet scheduler 742 schedules the stored frames for transmission. The tagger 780 of the MAC TX manager 728 generates a tag identifier for each stored frame such that the access manager 724 is able to identify the source of (e.g., the application initiating) each frame stored in the common queue. A tag identifier is optionally stored in the MBX Q 744 in association with each stored frame entry (e.g., 744a) such that, for example, the tag identifier is located and retrieved in response to a query using an indication of the identifier of the associated stored frame. An indication of the tag identifier is optionally stored (e.g., in place of the tag itself) by storing each frame in a location of the queue 744 (or in a separate queue as in the queues 744 and 757) that is associated with a particular protocol.

In response to the selective media access controller 700 receiving frames from a second application, the access manager 724 stores the received frames from higher layers (e.g., as entries 754a, 754b, 754c, through 754n) in a common queue (e.g., MBX Q 754) of a channel access controller 751. The packet scheduler 752 schedules the stored frames for transmission. The tagger 780 of the MAC TX manager 728 generates a tag identifier for each stored frame such that the access manager 724 is able to identify the source of (e.g., the application initiating) each frame stored in the common queue. A tag identifier is optionally stored in the MBX Q 754 in association with each stored frame entry (e.g., 754a) such that, for example, the tag identifier is located and retrieved in response to a query using an indication of the identifier of the associated stored frame.

In response to receiving a frame received as a response to a callback routine, the access manager 724 is operable for routing the received frame. The MAC TX manager 724 is operable for retrieving the tag (e.g., associated with the store frame used to initiate the callback routine) and for using to the retrieved tag to send the received frame to the associated half (e.g., route A or route B) of the split MAC layer.

The state machine 740 is a channel access controller operable for controlling various access manager 724 functions pertaining to the first application operating over one network (Route A or Route B). For example, the controlled functions include performing CSMA/CA for access to the PHY layer, virtual carrier sensing (VCS) using VCS timer 746, and performing back-off channel access using timer 748.

The state machine 750 is similar to the state machine 740, except that the state machine 750 is operable to perform the various functions with respect to the second application operating over the other network (the other of Route A or Route B). For example, the state machine 750 performs CSMA/CA functions (e.g., using back-off timer 758 and VCS timer 756) in accordance with protocols associated with the second application. The state machine 740 and the state machine 750 are mutually operable to share state information between the state machines such that, for example, CSMA/CA functions can be interleaved to avoid collisions and improve network throughput.

For example, the state machine 740 and the state machine 750 are operable to perform CSMA/CA functions concurrently with each maintaining its own VCS timer (e.g., 748 and 758) and back-off (e.g., 746 and 756) mechanisms. To avoid collisions (e.g., attempting to transmit frames that would otherwise have transmissions times that would overlap), state information is exchanged between the two channel access controllers 741 and 751. When a second channel access controller (e.g., channel access controller 751) is scheduled to transmit a frame, the second channel access controller accesses state information of the first channel access controller to determine whether a transmission of the frame by the second channel access controller would overlap (e.g., interfere) with a scheduled transmission of the first channel access controller. Likewise, the first channel access controller is operable to access the state information of the second channel access controller to determine whether a transmission of the frame by the first channel access controller would overlap (e.g., interfere) with a scheduled transmission of the first channel access controller. When such a (e.g., potential) overlap is detected, the transmission of the later scheduled frame is deferred to a later time (e.g., in which no overlap would occur) to avoid a transmission collision. Accordingly, the frame scheduled to transmit first is permitted to proceed without interruption (e.g., which increases the effective bandwidth of communications through the selective media access controller 700), and the later scheduled frame is rescheduled to a time that is after the completion of the transmission of the earlier frame.

In various embodiments, priority is assigned using other factors (such as the network used, the application making the call for which the frame is to be transmitted, network loads, token passing, and the like) by directing the lower-priority channel to reschedule to a later time. Typically, the lower-priority channel is directed to reschedule to a later time if the transmission of the lower-priority channel frame has not been started (e.g., even if the lower priority channel frame has been scheduled to transmit at a time earlier than the time at which a frame from a higher priority channel has been scheduled to be transmitted).

In various embodiments, the selective media access controller 700 includes more than two channel access controllers. The CSMA/CA techniques described above are implemented, for example, by each channel access controller accessing the state information of all other channel access controllers. When a contention issue (e.g., potential overlap of the transmission of both frames) is determined, the contention is resolved in accordance with a contention policy (e.g., first in/first out, network priority, usage, application importance, and the like).

In various embodiments, differing PHY protocols (where the channel access to the physical layer is different for each network) are possible as illustrated below with reference to FIG. 8. The differing PHY protocols are used in combination with the differing MAC protocols disclosed above.

Figure 8:
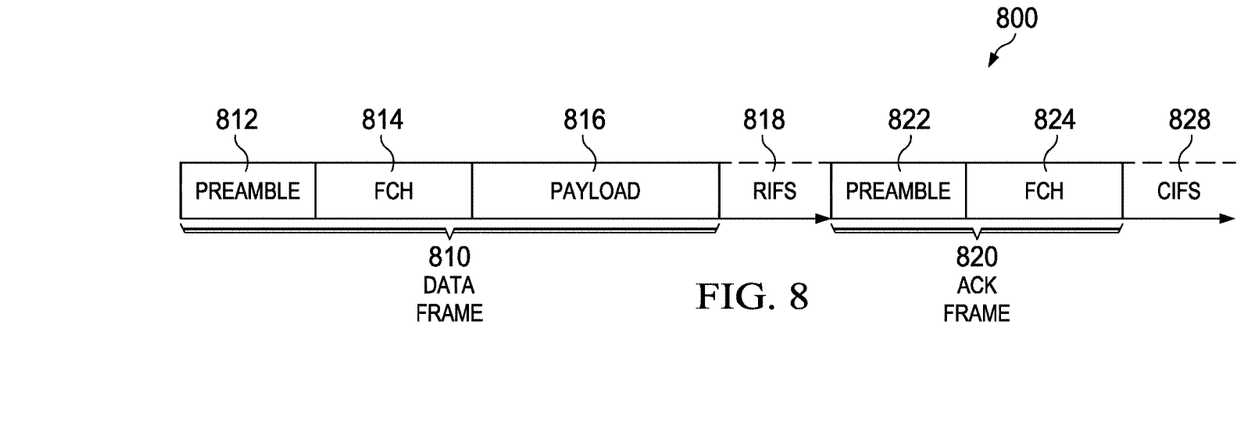
FIG. 8 is a signal diagram illustrating PHY layer protocol identification in selective media access control in accordance with various embodiments of the disclosure.

FIG. 8 is a signal diagram illustrating PHY layer protocol identification in selective media access control in accordance with various embodiments of the disclosure. In various example scenarios having two or more networks, each such network can be selected where a first network has a PHY protocol (and different MAC route) that is different from the PHY protocol (and the associated MAC route) of a second network that share a common communications medium. For example, the PHY layers of both the first network protocols and the second network protocols are operable to operate in a same frequency band (e.g., tone mask). Despite being operable to operate in the same (or overlapping) frequency, the PHY-level protocol of the associated network is identifiable by analyzing the preamble pattern. The associated network itself is identifiable in response to the identification of the PHY-level protocol, for example, in implementations operating in accordance with a different PHY-level protocol for each network operable for accessing the shared communications medium. (In other embodiments, differing networks can use the same PHY-level protocol to share the physical transmission medium.)

Scenario 800 illustrates a transmission by a first networked entity of a data frame 810 using a physical medium carrying communications in accordance with differing PHY protocols. For example, a processor is operable for receiving payload data of a first media access control (MAC) frame and for receiving an indication of a selected network operable for transmitting the payload data of the first MAC frame. The processor selects an appropriate MAC-level protocol in response to the indication of the selected network and queues the payload data for transmission using data frame 810.

The data frame 810 includes a preamble 812 (e.g., for identifying the network associated with data frame 810). After the preamble 812 is transmitted by the first networked entity, the first networked device transmits the remainder of the data frame 810, which normally includes a frame control header (FCH) 814 and the (e.g., data) payload 816. The transmission of the data frame 810 is typically followed by a response inter-frame space (RIFS) 818.

A second networked entity identifies the particular PHY protocol used (and accordingly the associated network) by analyzing (e.g., decoding) the received preamble of data frame 810 and, in response, transmits an acknowledgement (ACK) frame 820 using network protocols (e.g., PHY protocols) appropriate for the network identified by the received preamble.

When the second networked entity receives the data frame 810, the PHY layers of the second networked entity analyzes the received preamble 812 to identify the associated network and decodes the FCH 814 and the payload 816 in accordance with the identified network. The PHY layers of the second networked entity transfers information associated with the received packet (e.g., including the payload data and the identity of the identified network) to the MAC layer of the protocol associated with the incoming packet. The MAC layers of second networked entity decode the transferred information in accordance with the transferred information and passes the decoded information to higher levels of the associated protocol stack over the MAC-layer route that is associated with the identified network.

The second networked entity generates an acknowledgement reply in response to the decoded information being passed to higher levels of the associated protocol stack. The acknowledgement reply is (e.g., generally) formed using the protocols in the MAC and PHY layers associated with the identified network. For example, the second networked entity transfers information related to the acknowledgement over a route through the MAC layers that are associated with the identified network. The MAC layers associated with the identified network selects the PHY protocol that is associated with the identified network and transmits the ACK frame 820 in response.

The transmission of the ACK frame 820 terminates the RIFS 818 period. The ACK frame includes a preamble 822 (e.g., that includes information identifying the identified network) and a FCH 824. The transmission of the ACK frame 820 is followed by a contention inter-frame space (RIFS) 828, during which time for example, any networked entity can attempt to transmit a new data frame.

The transmission of frames 810 and 820 are typically transmitted in accordance with the separate channel access procedures performed by selective media access controllers such as selective media access controllers 500 and 700. In an embodiment, a first network is operable in accordance with the IEEE P1901.2 protocol and a second network (e.g., that shares the physical communications line with the first network) is operable in accordance with the G3-PLC protocols. In various embodiments, separate channel access procedures performed by selective media access controllers are operable in scenarios in which the PHY layer includes transmissions in which more than two protocols are used for transmitting data frames over two networks.

The various embodiments described above are provided by way of illustration only and should not be construed to limit the claims attached hereto. Those skilled in the art will readily recognize various modifications and changes that could be made without following the example embodiments and applications illustrated and described herein, and without departing from the true spirit and scope of the following claims.

What is claimed is:

1. A network device comprising:
a split network stack having a physical (PHY) layer associated with a first media access control (MAC) protocol sublayer for a first network and the PHY layer associated with a second MAC protocol sublayer for a second network, wherein the PHY layer is associated with a single communications medium;
a processing device; and
memory storing instructions that, when executed by the processing device, cause the processing device to:
select a first route for a first frame through the split network stack to the PHY layer via the first MAC protocol sublayer, but not the second MAC protocol sublayer, based on an association of the first frame with the first network; and select a second route for a second frame through the split network stack to the PHY layer via the second MAC protocol sublayer, but not the first MAC protocol sublayer, based on an association of the second frame with the second network.

2. The network device of claim 1, wherein the memory additionally stores instructions that, when executed by the processing device, cause the frame to be communicated through the split network stack via the selected first route or second route.

3. The network device of claim 2, wherein the frame is stored in the memory prior to being communicated through the split network stack via the selected first route or second route.

4. The network device of claim 3, wherein the selection of the selected first route and second route is based further on a network tag associated with the frame, the network tag indicating a network type on which the frame is to be transmitted or received.

5. The network device of claim 3, wherein the selection of the selected first route and second route is based further on a location in the memory at which the frame is stored.

6. The network device of claim 5, wherein the location is associated with one of a first MAC protocol corresponding to the first MAC protocol sublayer and a second MAC protocol corresponding to the second MAC protocol sublayer.

7. The network device of claim 5, wherein the memory includes a first queue and a second queue, the first queue being associated with a first MAC protocol corresponding to the first MAC protocol sublayer and the second queue being associated with a second MAC protocol corresponding to the second MAC protocol sublayer, and wherein the selection of the selected first route and second route is based further on whether the frame is stored in the first queue or the second queue.

8. The network device of claim 1, wherein the first MAC protocol sublayer corresponds to a first MAC protocol and the second MAC protocol sublayer corresponds to a second MAC protocol.

9. The network device of claim 8, wherein the first and second MAC protocols are of different types.

10. The network device of claim 9, wherein the first MAC protocol is a 6LoWPAN protocol and the second MAC protocol is a 6LoWPAN/LOAD protocol.

11. The network device of claim 1, wherein the network device is a smart meter device.

12. A method for operating a network device, the method comprising:

receiving a data frame for transmission over a respective one of a first network and a second network;

selecting a first route through a split network stack having a physical (PHY) layer, a first media access control (MAC) protocol sublayer associated with the first network, and a second MAC protocol sublayer associated with the second network, the first route including the PHY layer and the first MAC protocol sublayer but not the second MAC protocol sublayer; and transmitting a first data frame onto a communication medium associated with the PHY layer using the selected first route;

selecting a second route through the split network stack, the second route including the PHY layer and the second MAC protocol sublayer but not the first MAC protocol sublayer; and transmitting a second data frame onto the communication medium using the selected second route.

13. The method of claim 12, wherein selecting one of the first route and the second route is based further on a network tag associated with the frame, the network tag indicating a network type on which the frame is to be transmitted or received.

14. The method of claim 12, wherein selection of the selected first route and second route is based further on a location at which the frame is stored in a memory of the network device.

15. The method of claim 14, wherein the location is associated with one of a first MAC protocol corresponding to the first MAC protocol sublayer and a second MAC protocol corresponding to the second MAC protocol sublayer.

16. The method of claim 14, wherein the memory includes a first queue and a second queue, the first queue being associated with a first MAC protocol corresponding to the first MAC protocol sublayer and the second queue being associated with a second MAC protocol corresponding to the second MAC protocol sublayer, and wherein selection of the selected first route and second route is based further on whether the frame is stored in the first queue or the second queue.

17. The network device of claim 1, wherein PHY layer is configured to communicate with the first network and the second network over a shared network medium.

18. The network device of claim 1, wherein the split network stack includes a network layer, and the first MAC protocol sublayer and the second MAC protocol sublayer are configured to communicate with the network layer independently.

19. The network device of claim 1, wherein the first MAC sublayer is associated with higher layers of the split network stack, and wherein the second MAC sublayer is associated with lower layers of the split network stack.

* * * * *